Patented Jan. 2, 1940

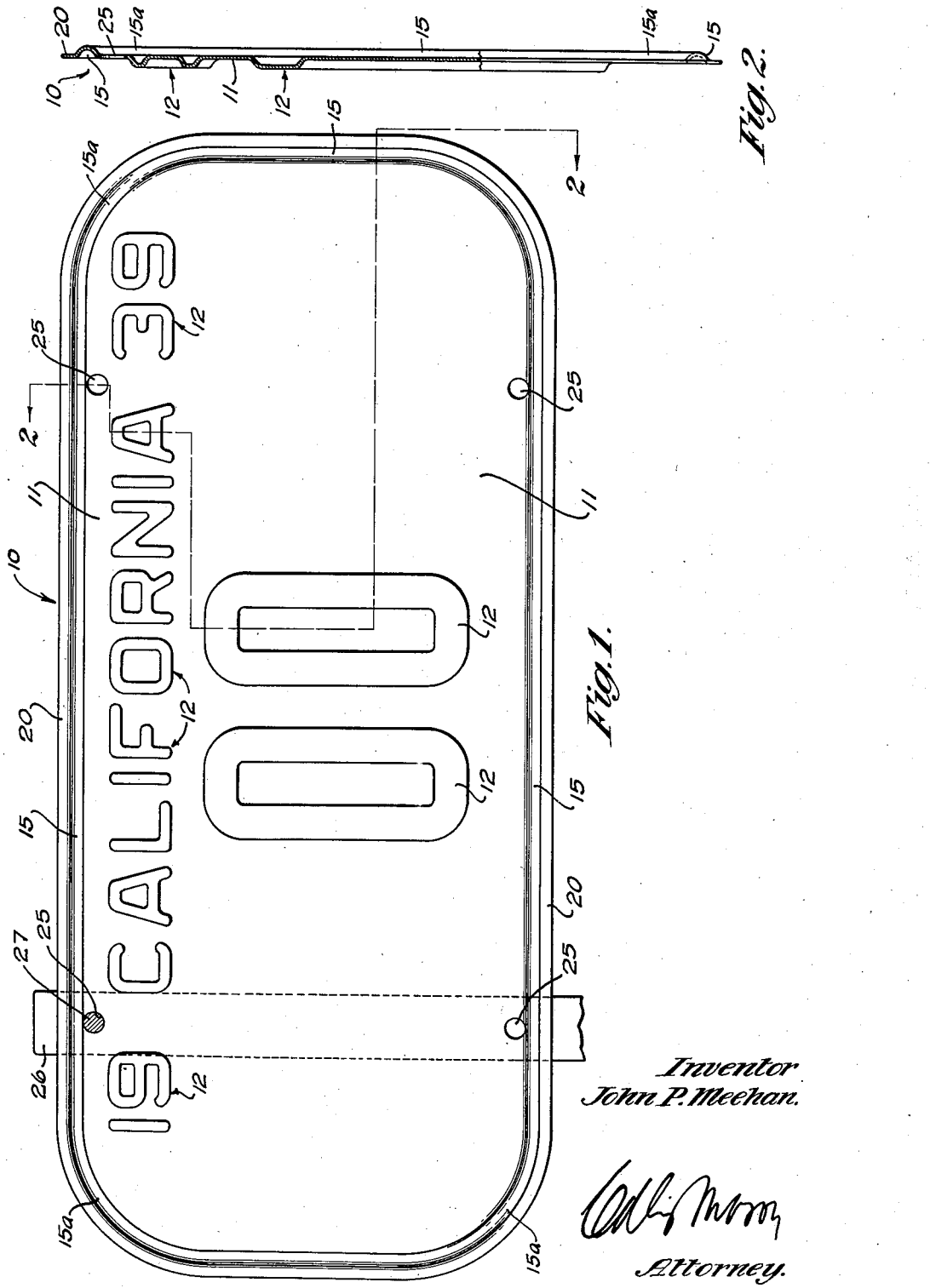

2,185,945

UNITED STATES PATENT OFFICE 2,185,945

VEHICLE LICENSE PLATE

John P. Meehan, San Marino, Calif.

Application September 2, 1939, Serial No. 293,159

3 Claims. (Cl. 40—125)

My invention has to do with vehicle license plates.

In modern times, the use of automobiles by criminals in making escape has given to automobile license plates a highly important role in tracing the flight of such criminals and, in this connection, public authorities have come to recognize the necessity of finding a license plate construction which, as far as possible, is not subject to being distorted, bent or broken unless considerable stresses are applied for that purpose, so that vehicle license plates may be correctly read at a glance. It is a well known fact that, in license plates of conventional construction, the larger percentage of distortion begins at and takes place from the squared or substantially squared corners, outward from the attaching bolts by means of which they are secured to the plate holding brackets on the vehicle. Those corner portions of the plate outward from the attaching bolt holes are most apt to become caught on some object and any further movement of the vehicle or object with respect to each other easily distorts the plate, causing undulations which cause light reflections misleading to anyone attempting to read the license plate indicia at a glance. Such distortions are rendered extremely easy in conventional license plate construction because the attaching bolts usually pass through openings in the license plate at a point spaced a substantial distance from the ends of the plates.

Furthermore, in the distribution of automobile license plates of conventional construction (they are usually distributed in rectangular envelopes into which are closely fitted the license plates) a considerable labor item is involved in removing the license plates from and inserting them in the envelopes, both in the initial packing and in the rechecking of the indicia at the time of mailing or distribution. This is due largely to the squared or relatively squared corners, such as are presented by conventional license plates, catching on the sides of the envelope.

It is therefore among my objects to provide a license plate which overcomes those shortcomings, which presents maximum distortion-resisting strength at the points most commonly subjected to such stresses, which may be inserted in and removed from distribution envelopes with maximum speed and ease and which is conducive to economical and easy manufacture.

Another feature of considerable economy contributed by my invention may be pointed out by stating that a large portion of automobile license plates are distributed by mail and those working in the art have sought to produce a plate having a maximum strength and minimum weight for any given length, width and gage of metal used in its construction. My invention has accomplished that and to a degree which, to my knowledge, has never before been achieved. For instance, the license plate specifications of many states require that the plate shall be not less than 13⅞ inches in length and 6¼ inches in width and that the metal of which they are composed shall be not less than 26 gage metal. Now, inasmuch as such plates are made and distributed in pairs, a pair of such plates, when constructed in accordance with conventional rectangular design, will weigh slightly more than one pound and will thus run the postage into the two pound class, substantially increasing the mailing cost. My invention will enable plates to be made in compliance with such specifications and yet have a weight of only one pound or under, and corresponding reductions in weight are possible in connection with other specifications by the use of my invention.

Those and still further objects and corresponding attainments of my invention will become obvious to those skilled in this art from the following detailed description of one example of my invention, for which purpose I shall refer to the accompanying drawing, in which:

Fig. 1 is a front view of a license plate embodying my invention; and

Fig. 2 is a developed cross-sectional view taken on line 2—2 of Fig. 1.

In general, I carry my invention into practice by providing a license plate having straight side and end edges, a peripheral flange, an indicia receiving field separated from the periphery by an embossed annular reinforcing channel which produces a reverse bead around the plate intermediate the flange and indicia receiving field. The attaching bolt receiving holes are provided through the indicia receiving field adjacent the channel and spaced substantially from the end edges and, in my improved plate, I curve the corner portions of the plate, including the flanged, channel and field portions about a substantial radius, said curvature extending from a point adjacent the respective attaching bolt holes to a point in the end edge which is substantially spaced from the plane of the nearest side edge. Such a curvature is provided at each of the four corners of the plate.

Referring now to the drawing, the numeral 10 designates a metal plate having a medial field portion 11 which presents indicia 12, here shown as indicating the State of "California" as being the issuing State, the year "1939" as being the wear of issue, and the license numerals "00". Such indicia is of course merely illustrative. Said indicia letters and numerals are embossed from the underside of the plate so that the letters and numerals are in a plane above that of the field 11. Surrounding the field 11 there is a channel 15, which is formed by embossing the plate from the top side to present an annular head. The portion of the plate which is thus embossed to provide the channel terminates in a peripheral flange 20, which flange is coplanar with the field. Adjacent the channel 15, at each side of the field 11, I provide a pair of spaced attaching bolt receiving holes 25 which pass through the field portion 11 a substantial distance from the plane of the end edge portion. These holes are provided so that the plate may be mounted upon a supporting bracket 26 (only one of which is shown in Fig. 1 by an attaching bolt 27 (one of which is shown in cross-section in Fig. 1).

The four corner portions of the plate, including the channel portion 15, the flange portion 20 and the field portion 11, are curved about a substantial radius between a point adjacent each of the attaching bolt holes 25 and a point spaced a substantial distance from the plane of the nearest end edge, so that substantially that entire portion of the plate which projects outwardly beyond the mounting brackets 26 is reinforced by the curved, embossed channel portion 15a and field 11 to render it practically impossible to bend or otherwise distort those portions of the plate unless considerable stresses are applied for the purpose. This construction also renders it possible to provide a plate having minimum weight commensurate with a given length, width and gage of metal.

I have said that the corner portions of the plate should be curved about a substantial radius—that is the corners of the outer edge should be curved about a radius of not less than one-fourth the width of the plate, which is of the order shown in the drawing, although if the desired weight reduction and rigidity for a given width, length and thickness of plate and type of metal will permit, a slight variation of this minimum radius is possible within the scope of my invention. The curved corners should begin half way or less from the nearest attaching bolt hole 25 to the plane of the nearest end edge (assuming that plane to be in the position it would occupy if the corners were squared instead of rounded), and should extend a substantially equal distance into the end edge, as shown in the drawing. The channel or bead portions 15a should be closely adjacent and substantially parallel to the curved outer corner edges of the plate to provide adequate rigidity for the end portions of the plate. The bolt holes 25 lie in the reinforcing zone of the corner bead.

While, in the foregoing description, I have resorted to various details of structure and association of parts, I wish it understood that I do not thereby confine my invention to such specific details. Rather, various modifications and adaptations may be made within the broader scope of the invention as defined by the appended claims.

I claim:

1. A vehicle license plate of the class described, comprising: a flat metal plate having parallel straight side edges, parallel straight end edges and a medial field portion, said side and end edges being connected by curved corner portions each of which has a radius of not less than one-fourth the distance between said side edges, and an embossed bead surrounding the field portion, said bead having curved corner portions closely adjacent and substantially parallel to the first mentioned respective curved corner portions, whereby to provide increased rigidity of the plate at and adjacent said corner portions, the arc of each corner extending substantially 90°.

2. A vehicle license plate of the class described, comprising: a flat metal plate having rounded corners and relatively straight side edges, the curvature of said rounded corners being of a radius not less than one-fourth the distance between said side edges, a medial indicia carrying field, an embossed channel around the field, said channel having rounded corner portions defining the corners of the field and relatively straight side portions defining the sides of the field, and a peripheral flange co-planar with the field, the arc of each corner extending substantially 90°.

3. A vehicle license plate adapted to be secured to a vehicle by attaching bolts or the like, comprising: a flat metal plate having straight side and end edges, means for securing the plate to a vehicle, including a pair of attaching bolt holes spaced apart along and adjacent each side edge, one hole of each pair being spaced inwardly a distance from the plane of one end edge equal to approximately half the distance between the side edges and the other hole of each pair being spaced inwardly a substantial distance from the plane of the opposite end edge equal to approximately half the distance between the side edges, said side edges being connected to the said end edges by curved corner portions each of which begins at a point half-way or less from the nearest attaching bolt hole to the plane of the nearest end edge, and each corner portion extending substantially 90°, and an embossed reinforcing bead adjacent, parallel to and co-extensive with said curved corner portions.

JOHN P. MEEHAN.